US012716366B2

(12) United States Patent
Antheaume

(10) Patent No.: US 12,716,366 B2
(45) Date of Patent: Aug. 25, 2026

(54) METHOD OF PRE-OPERATIONAL CLEANING OF WATER AND STEAM SYSTEMS IN COMBINED CYCLE POWER PLANTS AND COMBINED CYCLE POWER PLANT ARRANGED THEREFOR

(71) Applicant: GE Infrastructure Technology LLC, Greenville, SC (US)

(72) Inventor: Olivier Antheaume, Belfort (FR)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/968,557

(22) Filed: Dec. 4, 2024

(65) Prior Publication Data

US 2025/0188848 A1 Jun. 12, 2025

(30) Foreign Application Priority Data

Dec. 12, 2023 (EP) .................................... 23216011

(51) Int. Cl.

| | |
|---|---|
| ***F01D 25/00*** | (2006.01) |
| *F22B 37/52* | (2006.01) |
| *F22B 37/56* | (2006.01) |

(52) U.S. Cl.

CPC ........ *F01D 25/002* (2013.01); *F05D 2220/31* (2013.01); *F05D 2220/32* (2013.01); *F05D 2220/72* (2013.01); *F05D 2220/74* (2013.01); *F05D 2260/80* (2013.01); *F05D 2260/95* (2013.01); *F22B 37/52* (2013.01); *F22B 37/56* (2013.01); *F22B 37/565* (2013.01)

(58) Field of Classification Search

CPC ...... F01D 25/002; F22B 37/52; F22B 37/565; F22B 37/56; F22B 37/486

See application file for complete search history.

(56) References Cited

U.S. PATENT DOCUMENTS

| | | | | |
|---|---|---|---|---|
| 7,918,235 | B2 * | 4/2011 | Ohler | B08B 9/08 134/169 R |
| 10,612,771 | B2 | 4/2020 | Bloch | |
| 2008/0236616 | A1 | 10/2008 | Bloch | |
| 2009/0107532 | A1 | 4/2009 | Lonne et al. | |
| 2013/0330172 | A1 * | 12/2013 | Scipio | F01D 25/002 137/15.01 |
| 2015/0075630 | A1 * | 3/2015 | Davis | G01N 25/42 137/565.11 |
| 2020/0173651 | A1 | 6/2020 | Hiat | |
| 2024/0133316 | A1 * | 4/2024 | Ueda | F01K 11/02 |

FOREIGN PATENT DOCUMENTS

| | | |
|---|---|---|
| EP | 2426322 A1 | 3/2012 |

OTHER PUBLICATIONS

European Search Report of EP Application No. 23216011.9 dated May 16, 2024, 8 pages.

* cited by examiner

*Primary Examiner* — Katheryn A Malatek

(74) *Attorney, Agent, or Firm* — Fletcher Yoder P.C.

(57) ABSTRACT

A method of pre-operational cleaning of water and steam systems in a combined cycle power plant including a gas turbine engine, a steam turbine system, a condenser, and a heat recovery steam generator.

20 Claims, 5 Drawing Sheets

METHOD OF PRE-OPERATIONAL CLEANING OF WATER AND STEAM SYSTEMS IN COMBINED CYCLE POWER PLANTS AND COMBINED CYCLE POWER PLANT ARRANGED THEREFOR

CROSS-REFERENCE TO RELATED APPLICATIONS

This application claims priority pursuant to 35 U.S.C. 119(a) to European Application No. 23216011.9, filed Dec. 12, 2023, which application is incorporated herein by reference in its entirety.

FIELD OF THE INVENTION

The present disclosure relates to pre-operational cleaning of new or refurbished components in combined cycle power plants and, more particularly, to a method of pre-operational cleaning of water and steam systems in a combined cycle power plant.

BACKGROUND OF THE INVENTION

A combined cycle power plant utilizes a gas turbine engine and a steam turbine engine in combination to produce power. In the combined cycle power plant, the gas turbine engine is thermally connected to the steam turbine engine through a heat recovery steam generator (HRSG). The HRSG is a non-contact heat exchanger that allows feed water for the steam generation process to be heated by otherwise wasted gas turbine engine exhaust gases. The HRSG may be a large duct with tube bundles interposed therein such that water conducted through the tube bundles is heated to steam by the exhaust gases passing through the duct.

Modern combined cycle power plants use a multi-pressure HRSG which may have three different operating pressures (high, intermediate, and low) with components to generate steam at the various pressures and temperatures. The HRSG may include, for example, a low pressure section, an intermediate pressure section, and a high pressure section, each of which may generally include one or more economizers, evaporators and/or superheaters. The steam at the respective pressure is used as vapor feed to the corresponding stages of the steam turbine system. The gas turbine system and the steam turbine system drive one or two generators that produce electrical power.

Used steam from the steam turbine system is exhausted into a condenser, where the steam condenses, and the condensate is then fed from the condenser back to the HRSG via one or more conduits with the aid of a condensate pump.

The purity of the steam in the operation of a power plant has to satisfy stringent requirements. It is important to avoid a situation, where particulate debris is entrained in the steam and may impair operation of the power plant or even cause damage to plant components. For example, particulate debris may plug steam screens or clog narrow steam passages. Particulate debris may cause erosion and impact damage to stationary and rotating components of the steam turbines and may also plug or damage the internal surfaces of steam valves used to control the flow of steam.

During fabrication and erection of a combined cycle power plant, contaminants such as weld spatter, swarf, welding electrode residues, mud, sand, dust, and the like may remain in the system despite all cautionary measures taken. The contaminants are sometimes present loosely, and sometimes they adhere to the inner walls of the plant parts.

Therefore, in typical prior art methods for the startup of new and refurbished steam turbine generator facilities, numerous methods have been employed to remove particulate contamination from the interior surface of steam-carrying equipment and piping, including the HRSG region, steam lines between the HRSG and the steam turbine system and steam lines leading to the condenser, and control valves therein. Generally, such steam-carrying components are blown out or flushed out before commissioning the gas turbine engine and before every first steam pulse of the steam turbine system to ensure that they are free of particulate contaminants before the startup.

Pre-operational cleaning methods of the art involve flushing the steam and water system components with treated water and chemical cleaning procedures which may include hot alkaline degreasing, acid cleaning, passivation, rinsing and/or air blow cleaning, followed by inspection of the drums and low point headers and hand cleaning or rinsing of any deposits therein. Only then will the gas turbine engine and entire combined cycle power plant be commissioned.

It is also known to perform a steam blow procedure wherein the steam generators and associated steam lines are blown using steam discharged to atmosphere via a temporary piping and silencer installed at the steam turbine isolation and control valves. The steam blows can be continuous or discontinuous (pulse blows) and are generally performed at low load with low exhaust pressure to reach the desired disturbance factors. Some other methods include combined steam load to atmosphere and to condenser via temporary piping. Steam dump to condenser in a normal bypass operation without reaching a high disturbance factor and without target validation of the cleaned water and steam system components has also been used, but is less efficient than required.

U.S. 2009/0107532 discloses a method for pre-operational cleaning of plant parts of a power plant, comprising routing a medium continuously in a closed flow circuit through one or more plant parts to be cleaned and testing the medium for a degree of purity of an operational plant part. Steam is extracted from a steam boiler device, and liquid obtained from the steam in the condenser is supplied to the operational plant part and is routed in a closed flow circuit for cleaning the plant parts via steam. To bypass the high-pressure stage of the steam turbine unit, a branch from the high-pressure steam line is provided for temporary cleaning facilities with a temporary steam line system and blow-out inserts and with a measuring device arranged between the blow-out inserts. The measuring device is a polished metal baffle plate, which is introduced into the steam line transversely with respect to the flow direction and which allows the degree of purity of the medium to be observed visually and judged, during the blow-out operation, by means of particle impacts impinging onto the baffle plate. The method requires installation of the temporary steam line system for performing the steam blow procedure. The temporary steam line system and the temporary blow-out facilities are to be removed for normal operation of the power plant. This increases workload, expense and time required for the pre-operational cleaning.

U.S. Pat. No. 10,612,771 discloses a method of pre-operational cleaning of water and steam systems in a combined cycle power plant including steam blow to a condenser with light pre-operational cleaning and using a temporary piping to first steam blow to atmosphere and then using another temporary piping to blow the steam to the condenser bypassing the bypass valves on the line going to condenser. The temporary piping and equipment is designed to allow base load or maximum 100% load operation. In order to monitor and confirm exhaust steam cleanliness, a target insertion device in the form of a highly polished metal plate is inserted into the steam blow exhaust and can be removed and examined to determine the continued presence of particulate contamination in the exhausting steam. The steam blow procedure is efficient and can be performed during the commissioning of the gas turbine engine. But the temporary piping, temporary equipment and temporary control required for the entire validation steam blow procedure greatly increase the corresponding configuration and reconfiguration workload, material requirements and costs. In addition, since the first steam blow is discharged to atmosphere, an atmospheric silencer must be provided and used at the exhaust point of the steam to atmosphere to avoid excessive noise pollution.

Conventional methods for pre-operational cleaning of steam generation equipment and piping use large temporary piping arrangement with the corresponding configuration and reconfiguration workload, manpower needed and material costs; they perform steam blow to atmosphere with the need for atmospheric silencers and large amount of demineralized water; they cannot be carried out in parallel to a normal commissioning of the gas turbine engine; and/or they are time-consuming and cost-intensive to implement.

SUMMARY OF THE INVENTION

It is an object of the present disclosure to provide a new method of pre-operational cleaning using validation steam blow of water and steam systems in combined cycle power plants which overcomes one or more of the above-mentioned deficiencies of the conventional pre-operational cleaning methods. The method should allow for efficient cleaning of the steam and water systems and may preferably be performed at least in part in parallel to the commissioning of the gas turbine system to facilitate reducing fired hours and fuel consumption in the gas turbine system and demineralized water consumption for the pre-operational cleaning. In addition, the method should present no safety concerns and no visual pollution and should meet noise and emission compliances.

It is a further object of the present disclosure to provide a combined cycle power plant arranged for performing such a pre-operational cleaning.

In order to meet the above objects, according to one aspect of the invention, a method of pre-operational cleaning of water and steam systems in a combined cycle power plant is provided. The combined cycle power plant includes a gas turbine engine, a steam turbine system, a condenser, and a heat recovery steam generator (HRSG). The method comprises: performing a pre-operational initial flushing and chemical cleaning operation on the water and steam system of the finally constructed combined cycle power plant; firing the gas turbine engine and commissioning the gas turbine engine; while the gas turbine engine is being commissioned, performing a validation steam blow procedure including a steam blow operation, wherein steam is generated in the HRSG and blown at high velocities, temperatures and cleaning force ratio conditions through a portion of a closed flow circuit for cleaning steam carrying parts of the HRSG and steam lines connecting the HRSG to the steam turbine, wherein the steam is routed to bypass the steam turbine system via permanent operational bypass lines, without using any temporary piping, and is discharged to the condenser; and monitoring and validating cleanliness of selected steam blown steam lines.

In the method of present invention, the normal commissioning of the gas turbine system is performed in parallel to the validation blow procedure. In particular, the normal and full gas turbine commissioning activities can be performed driving the gas turbine in bypass operation to Full Speed No Load (FSNL) conditions, performing synchronization and HRSG safety valve testing, loading the gas turbine system up to base load for combustion tuning with the fuel gas strainers installed, and other common commissioning activities. The power plant may start up as per normal configuration without any temporary or manual control. No temporary piping or lines are required such that configuration and reconfiguration of the plant for performing the pre-cleaning is minimal.

A temporary pipeline or line is understood as meaning, in particular, a steam pipeline or line that is required and to be installed for the cleaning process only, e.g., for bypassing the steam turbine system. In contrast, a permanent operational pipeline or line is required and installed for the normal operation, e.g., for bypassing the steam turbine system under specific operating conditions, such as load rejection. Since no such temporary piping, temporary compressors, temporary flow-out means and temporary control are required by the method of present invention, the efforts, time and costs of personnel and material for performing the pre-cleaning may be greatly reduced.

In addition, the validation blow to condenser methodology avoids blowing the steam to atmosphere, as is done in some conventional pre-cleaning methods. Thus, demineralized water consumption to maintain cycle water quality, to mitigate noise, and to minimize visual pollutions may be limited. In addition, performing the commissioning of the gas turbine system in parallel to the validation blow procedure facilitates limiting fired hours and fuel consumption in the gas turbine system and meeting emission compliance during the steam blow at high load. There are no safety concerns as the plant is in normal operation including all normal regulation and protection means. Efficient cleaning may be achieved with thermal cycling and maximum cycled temperatures. Early steam quality is obtained due to the extensive pre-operational cleaning with the condenser included in the steam flow path, wherein the cycle is under vacuum and running at high loads.

With the new generations of gas turbine systems, the gas turbine engine exhaust temperature is higher, and the method does not have limitation with some dry steam sections in the HRSG and is also not limited by the design temperature of any temporary piping, which might require additional attemperation. With the new generation of gas turbine engines, the steam flow is getting much higher, and traditional pre-cleaning methods represent significant demineralized water consumption. As a result, the temporary piping and installation in conventional systems is also getting progressively larger.

In the method of the present invention, the pre-operational initial flushing and chemical cleaning operation may include any commonly known chemical cleaning procedures, including open or closed flushing, hot degreasing, acid cleaning, passivation and rinsing. The chemical cleaning is done on the complete steam and water system, including HRSG drums, economizers, evaporators, superheaters and reheater, balance of plant steam lines, auxiliary steam lines, feed water lines and the condensate system. In some particular cases, the acid cleaning can be limited to the HRSG water and steam system if the steam piping from HRSG to steam turbine is mechanically cleaned by another method (e.g., shot-blasted after prefabrication and installed cleaned or hydro-blasted and inspected after installation). Once the chemical cleaning is completed, extended inspection at various locations including low points and HRSG collectors may be performed, and the locations may be hydrolyzed using jets of high-pressure water for cleaning to remove any remaining solid deposits from chemical cleaning. Together with the steam blow procedure, all steam generating plant contaminants, such as sand, dust, mud, weld splatter, swarf, welding electrode residuals, and the like, which may remain in the system after fabrication and erection of the power plant, may be efficiently removed prior to initial start-up of the plant.

In any above-mentioned version of the method, the steam blow operation may be advantageously performed, while the gas turbine engine is operated at base load or maximum load conditions. The steam-carrying parts of the HRSG, the steam lines and the operational bypass lines (including bypass valves) that are to be steam blown may each be designed for a cleaning force ratio CFR of at least 1.1 or even at least 1.2. During the commissioning, the gas turbine engine is loaded to base load, in order to achieve the desired and required CFR to provide for efficient cleaning of the steam system.

The overall steam blow procedure and calculation may be greatly simplified, when it is well-integrated in the initial design and concept processes. The various steam blow cases may be calculated by engineers at the initial engineering and procurement phase of a project for the construction of a new combined cycle power plant to allow for a sufficient CFR on the HRSG and steam lines. The steam blow cases may be included in the bypass functional specification among other normal operation scenarios to allow the pipeline and bypass suppliers to size the bypass lines and bypass valves accordingly. Then, the need for specific equipment for the validation blow procedure may be limited.

In order to determine what the steam bypass capability shall be for the validation steam blow, it may be checked at which pressure each piping section shall be operated to exceed the expected CFR with the steam flow available, when operating the gas turbine engine at base load on steam bypasses under the expected realistic ambient conditions for the steam blow. For this purpose, usually the normal ambient conditions may be considered and are generally acceptable.

In preferred applications of any above-mentioned version of the method, the HRSG may have a plurality of pressure stages including a high-pressure (HP) stage, an intermediate-pressure (IP) stage, a low-pressure (LP) stage, and a reheater. The steam turbine system may include an HP steam turbine, an IP steam turbine, and an LP steam turbine. The steam lines to be steam blown may include at least an HP steam line for supplying HP steam from the HP stage of the HRSG towards the HP steam turbine, an IP steam line connecting the IP stage of the HRSG to the reheater, a hot re-heat (HRH) line for supplying IP steam from the reheater towards the IP steam turbine, a cold re-heat (CRH) line for receiving used HP steam from the HP steam turbine and supplying the used HP steam to the reheater, an operational HP bypass line arranged between the HP steam line and the CRH line, an operational HRH bypass line arranged between the HRH line and the condenser, and an operational LP bypass line arranged between the LP steam line and the condenser. Designing the permanent operational piping line may then include sizing and arranging at least the HP steam, IP steam, HRH, CRH, and LP steam lines and the HP, HRH, and LP bypass lines for a cleaning force ratio CFR of at least 1.1, preferably at least 1.2.

In any above-mentioned embodiment, the method may further comprise providing at least some of the bypass valves in the operational HP, HRH, and LP bypass lines with modulating sacrificial trims designed to increase the flow coefficient (CV) capability of the bypass valves to support a cleaning force ratio CFR of at least 1.2 for single HRSG plant configurations and at least 1.03 for multiple HRSG plant configurations.

Sacrificial trims may be installed in the bypass valves during the validation blow procedure only to prevent operational trims from being damaged and to increase the flow coefficient capability of the bypass valves. The sacrificial trims may have a reduced durability and may be removed from the bypass valves again when the validation steam blow procedure is completed. Permanent trims, which are included in the bypass valves for normal operation, may be sized based on the maximum loading cases except the steam blow case and may have greater strength and durability.

In some embodiments, when sacrificial trims are designed, a margin of about 10%, for example, can be added on the required valve flow coefficient CV of the sacrificial trim in order to make sure that the required cleaning force ratio CFR can be met in the true operating conditions at site. For the HP bypass line, the sacrificial trim which provides the maximum CV that the valve body can accommodate can be provided in order to be able to perform the validation blow under the base load conditions. In some embodiments, the sacrificial trims may consist of a piston with an associated gasket and a cage having, e.g., an increased number and/or size of holes to allow for higher volumetric flows and velocities of the steam passing therethrough.

When designing the HP bypass line and the HP bypass valve, the bypass attemperation flows, which may be required, may also be taken into account. The temperature set point of the HP bypass attemperation may be set based on the expected CRH pressure, as per normal bypass attemperation control, but using the expected CRH pressure at the time of the steam blow.

Any above-mentioned embodiment of the method may further comprise positioning take-off connections of the operational HP, HRH, and LP bypass lines as close to the steam turbine system as can be accomplished, in close vicinity and just upstream of the control and isolation valve assemblies of the HP, IP, and LP steam turbines. "As close as can be accomplished" means reasonably close to the steam turbine system to avoid the bypass lines being affected by the turbine building, the type of the condenser, and the like. The bypass lines will not be installed in the HRSG area, in particular not on the HRSG pipe rack, but rather closer to the steam turbine system. The HRH and LP bypass lines can be installed directly in the steam turbine area. The HP bypass line will not be installed directly in the steam turbine area, but as close as possible and reasonable thereto. The non-return valve on the CRH line and a downstream connection of the HP bypass line to the CRH line should also be positioned as close to the HP steam turbine as can be accomplished. In this manner, longer sections of the steam-carrying parts and steam lines may be cleaned by steam blowing.

In any above-mentioned embodiment, the method may further comprise installing target inserts, preferably in the form of mirror or highly polished steel plates, at least in the HRH and LP steam lines. The target inserts are configured and arranged to allow for online target inspection and monitoring of cleanliness at the steam temperatures and pressure operating conditions during the validation blow procedure. The target inserts may visually show impacts of debris entrained by the steam blow.

In any above-mentioned embodiment, the method may further comprise installing steam flow meters in relevant portions of the steam carrying parts of the HRSG, steam lines and operational bypass lines and online calculating of the CFR in the relevant portions based on steam flow measurements of the steam flow meters during the validation steam blow procedure.

The type of steam flow meter can be a venturi or nozzle type, for example. The CFR calculations may be included as part of the normal plant control software to verify the cleaning ratio during validation blows.

Any above-mentioned embodiment of the method may further comprise providing inspection/cleaning ports in non-steam blown sections of the steam lines; and inspecting and cleaning, if necessary, the non-steam blown sections after the validation blow procedure is completed. The cleaning may be performed by rinsing using demineralized water, for example. It may be ensured that all critical paths, dead legs, and the like are substantially free of contaminants.

In some favorable embodiments of any above-mentioned method, at least some of the take-off connections of the HP, HRH, and LP bypass lines may be provided with a T connection which is straight to the respective bypass line and not straight to the respective steam turbine section in order to reduce accumulation of debris in dead legs upstream of the respective steam turbine section. This may save time for inspecting and cleaning on the critical paths. Some of the normally required inspection and cleaning ports may then be omitted. This approach may be particularly applicable for configurations without steam isolation valves and sections upstream of steam isolation valves. This approach may also be of particular interest in the case of HP steam lines, where the option of adding inspection flanges or ports is more challenging. In addition, recent studies have indicated that a straight line to the bypass might limit erosion of the steam turbine valves during long-term plant operation.

Any above-mentioned embodiment of the method may further be applied to a combined cycle power plant including a multi-unit configuration comprising a single steam turbine system, a first unit including a first HRSG and a first gas turbine engine, and a second unit including a second HRSG and a second gas turbine engine. The method may then preferably comprise performing the validation blow procedures independently between the units. This may be readily accomplished since common sections of the units are not included. Preferably, the validation blow procedures for the first and the second unit are performed one after the other. In favorable embodiments, the validation blow procedure on one of the first and second unit may be performed, while simultaneously inspecting and cleaning dead legs following the validation blow procedure in the other unit. This may save time for completing the pre-operational cleaning.

In some embodiments of the method applied to the combined cycle power plant including a multi-unit configuration, the method may comprise performing validation blow in one of the first and second units, while using at least one bypass line and bypass valve in the other unit to route the validation steam therethrough. This may help avoid oversizing the bypass valves in the bypass lines.

As an alternative, an HP steam line connection to the HRH warming line might be used for multi-unit plant configurations in order not to oversize the HP bypass valve. During validation steam blowing both the HP bypass line and the HP to HRH warming line may be used to reduce the HP bypass line pressure.

In some embodiments of any above-mentioned method applied to the combined cycle power plant including a multi-unit configuration, in cases where the HP bypass valve may not be capable to reach the sufficient CFR on the HP steam line or to limit the HP and CRH non-blown sections, a modified embodiment of the method may comprise installing a temporary jumper with an optional throttling device from the HP steam turbine valves of the HP steam turbine to a non-return valve on the CRH line and sizing the HRH bypass valves to allow for the required CFR of at least 1.03 on the HRH steam systems. The throttling device may be used on the temporary piping to limit the CFR on the HP steam system if required. Only limited temporary piping common for both units of the multi-unit plant configuration is used to avoid using the HP bypass lines and valves of both the units for the steam blow operation.

In addition, when temporary piping is used, the HP steam terminal attemperator, if used, may be designed to allow attemperation of the HP steam prior to entering the CRH steam line for the maximum steam blow conditions. When no HP terminal attemperator is available, a specific port may be provided on the HP steam line to allow temporary attemperation to be connected during the validation blow. Apart from these aspects, no temporary piping or equipment is used as such in each of the first and second units of the multi-unit configuration of the combined cycle power plant.

According to another aspect of the present invention, in order to solve the objects mentioned above, a combined cycle power plant is provided, which comprises: a gas turbine engine for generating power; a heat recovery steam generator (HRSG) fluidly connected to the gas turbine engine for receiving high energy exhaust gas produced from the generation of power in the gas turbine engine and configured for producing steam from the high energy exhaust gas; a steam turbine system fluidly connected to the HRSG via steam lines for receiving steam produced in the HRSG and configured for producing additional power from the steam; a condenser coupled to the steam turbine system for condensing used steam output from the steam turbine system and a condensate system for returning condensate from the condenser to the HRSG; permanent operational bypass lines fluidly connected between the steam lines and the condenser and arranged to bypass the steam turbine system; and a control system for controlling normal operation of the gas turbine system, the HRSG, the steam turbine system, and the condenser for generating power under varying operating conditions, the control system being further configured to perform a pre-operational cleaning of water and steam systems in the combined cycle power plant by: firing the gas turbine engine and commissioning the gas turbine engine; while the gas turbine engine is being commissioned, performing a validation steam blow procedure including a steam blow operation, wherein steam is generated in the HRSG and blown at high velocities, temperatures and cleaning force ratio conditions through a portion of a closed flow circuit for cleaning the steam carrying parts of the HRSG and steam lines connecting the HRSG to the steam turbine, wherein the steam is routed to bypass the steam turbine system via the operational bypass lines, without using any temporary piping, and is discharged to the condenser, and monitoring and validating cleanliness of selected steam blown steam lines.

The combined cycle power plant is designed for efficient final cleaning of the water and steam system from contaminants within a short period of time in preparation to normal operation of the power plant, e.g., after the power plant has been newly installed or serviced, in parallel to the commissioning of the gas turbine system without requiring any temporary piping, installation and control and corresponding configuration and reconfiguration, thereby achieving the advantages mentioned above in connection with the method of the present invention. The above described further embodiments of the method and associated effects and advantages apply equally to the combined cycle power plant. Most preferred embodiments of the combined cycle power plant of the present invention are as follows:

The control system may be configured to perform the steam blow operation, while operating the gas turbine engine at base load, i.e., maximum load conditions, and the operational piping of the HRSG, steam lines, and operational bypass lines including bypass valves to be steam blown may each be designed for a cleaning force ratio CFR of at least 1.03, of at least 1.1 or even at least 1.2.

In preferred embodiments of any above-mentioned type of combined cycle power plant, the HRSG may have a plurality of pressure stages including a high-pressure (HP) stage, an intermediate-pressure (IP) stage, a low-pressure (LP) stage, and a reheater. The steam turbine system may include an HP steam turbine, an IP steam turbine, and an LP steam turbine. The steam lines may include an HP steam line for supplying HP steam from the HP stage of the HRSG towards the HP steam turbine, an IP steam line connecting the IP stage of the HRSG to the reheater, a hot re-heat (HRH) line for supplying IP steam from the reheater towards the IP steam turbine, a cold re-heat (CRH) line for receiving used HP steam from the HP steam turbine and supplying the used HP steam to the reheater, an operational HP bypass line arranged between the HP steam line and the CRH line, an operational HRH bypass line arranged between the HRH line and the condenser, and an operational LP bypass line arranged between the LP steam line and the condenser. At least the HP steam, IP steam, HRH, CRH, and LP steam lines and the HP, HRH, and LP bypass lines may be sized and arranged for a cleaning force ratio CFR of at least 1.03, at least 1.1, and preferably at least 1.2.

In preferred embodiments of the combined cycle power plant, at least some of the bypass valves in the operational HP, HRH, and LP bypass lines may be equipped for the validation steam blow procedure with modulating sacrificial trims designed to increase the flow coefficient CV capability of the bypass valves so as to support a cleaning force ratio CFR of at least 1.2 for single HRSG plant configurations and at least 1.03 for multiple HRSG plant configurations. The sacrificial trims are installed to prevent the operational trims from being damaged during the validation blow procedure and to increase the flow coefficient capability of the bypass valves that may reduce the durability in some cases. The sacrificial trims may be removed from the bypass valves when the validation steam blow procedure is completed.

In any above-mentioned embodiment of the combined cycle power plant, the take-off connections of the operational HP, HRH, and LP bypass lines may be preferably positioned as close to the steam turbine system as can be accomplished, i.e., as close as possible and reasonable thereto, more remote from the HRSG area than the steam turbine area, not on the HRSG pipe rack and not directly in the steam turbine area, but in close vicinity and just upstream of the control and isolation valve assemblies of the HP, IP, and LP steam turbines. An isolation valve on the CRH line, if any, and a downstream connection of the HP bypass line to the CRH line may also be positioned as close to the HP steam turbine as can be accomplished, in order to allow for longer sections of operational piping to be steam blown.

In any above-mentioned embodiment of the combined cycle power plant, for the validation steam blow procedure, target inserts, preferably in the form of mirror or highly polished steam blades, may be installed in the HRH and LP steam lines 49, 41, respectively, and/or other steam-carrying parts and lines, wherein the target inserts may be configured and arranged to allow for online target inspection and monitoring of cleanliness at the steam temperatures and pressure operating conditions during the validation blow procedure.

In any above-mentioned embodiment of the combined cycle power plant, steam flow meters may be provided in relevant portions of the operational piping of the HRSG, the steam lines, and/or the bypass lines to be steam blown, and the control system may be configured to calculate the CFR in the relevant portions based on steam flow measurements of the steam flow meters during the validation steam blow procedure. The calculated CFR in the relevant portions may be presented to an operator of the power plant on a graphic interface of the control system 9 to allow the operator to verify that the required CFR is achieved.

In any above-mentioned embodiment of the combined cycle power plant, inspection/cleaning ports may be provided in non-steam blown sections of the steam lines to provide access for inspection and cleaning of the non-steam blown sections. Such sections may be acid-cleaned and hydrolyzed and inspected using borescopes, robotic cameras, and the like before the gas turbine engine is then fired for normal operation. Dead legs around the steam turbine system may be inspected during and after the steam blow procedure. Accumulated debris in dead legs may be removed by rinsing.

In favorable further embodiments of any above-mentioned combined cycle power plant, at least some of the take-off connections of the HP, HRH, and LP bypass lines may be provided with a T connection which is straight to the respective bypass line and not straight to the respective steam turbine section to reduce accumulation of debris in dead legs upstream of the respective steam turbine section. This may save time for inspecting and cleaning on the critical paths and allow to dispense with some of the inspection/cleaning ports. In addition, erosion of steam turbine valves during long-term plant operation may be reduced.

In preferred applications of any above-mentioned embodiments, the combined cycle power plant may include a multi-unit configuration comprising a single steam turbine system, a first unit including a first HRSG and a first gas turbine engine, and a second unit including a second HRSG and a second gas turbine. In the multi-unit configuration, the control system may be configured to perform the validation blow procedures independently between the units and one after the other. In particular, the control system may be configured to perform the validation blow procedure on one of the first and second units, while dead legs in the other unit are simultaneously inspected and cleaned following the validation blow procedure therein.

In some embodiments of any above-mentioned combined cycle power plant, in order not to oversize the bypass valves and/or to avoid installation of sacrificial trims in the bypass valves, the control system may be configured to perform a validation steam blow procedures in one of the first and second units using at least one bypass line and bypass valve in the other unit to route the validation steam flow therethrough.

As an alternative, an HP steam line connection to the HRH warming line may be used for multi-unit plant configurations in order not to oversize the HP bypass valve.

In some further embodiments of the combined cycle power plant, a temporary jumper may be installed between the HP steam turbine valves of the HP steam turbine and a non-return valve on the CRH line in order to route the HP steam therethrough and avoid using the HP bypass lines and HP bypass valves. The HRH bypass valves may be sized to allow for a CFR of at least 1.1 on the HP and HRH steam systems. These embodiments are particularly advantageous in applications where the HP bypass valves are not capable of reaching the sufficient CFR on the HP steam line or to limit the HP and CRH non-blown sections.

These and other advantages and features of the present invention will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein:

DETAILED DESCRIPTION OF THE INVENTION

Figure 1:
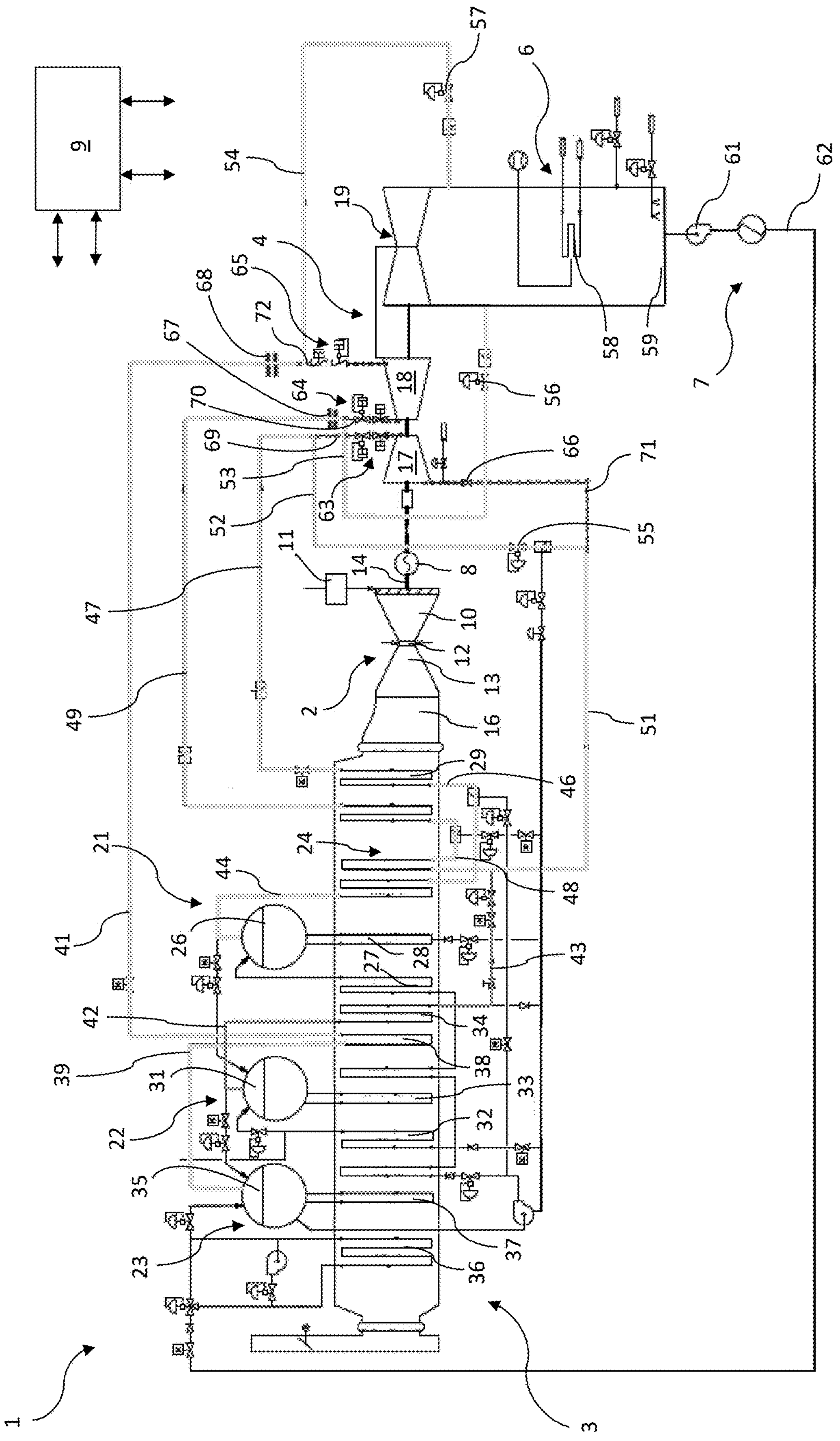
FIG. 1 is a process flow schematic of an embodiment of the present invention to accomplish pre-operational cleaning using validation steam blow of water and steam systems in a combined cycle power plant in a single HRSG configuration.

Referring now to the drawings, and in particular to FIG. 1, a combined cycle power plant 1, which may be referred to simply as power plant 1 in the following, is provided. The power plant 1 includes a gas turbine engine 2 for generating power; a heat recovery steam generator (HRSG) 3 fluidly connected to the gas turbine engine 2 to receive high energy exhaust gas produced from the generation of power in the gas turbine engine 2 and configured for producing steam from the high energy exhaust gas; a steam turbine system 4 fluidly connected to the HRSG 3 via steam lines to receive steam produced in the HRSG and configured for producing additional power from the steam; a condenser 6 coupled to the steam turbine system 4 for condensing used steam output from the steam turbine system 4 and coupled to a condensate system 7 for returning condensate from the condenser 6 to the HRSG 3; a generator 8 which is driven by the steam turbine system 4 and the gas turbine engine 2 to produce electrical power; and a control system that is only schematically shown in the form of a block 9 in FIG. 1 and that is configured for controlling normal operation of the gas turbine engine 2, the HRSG 3, the steam turbine system 4, and the condenser 6 for generating power under varying operating conditions. As is further explained below, the control system 9 is further configured to perform a pre-operational cleaning of water and steam systems in the combined cycle power plant 1.

The gas turbine engine 2 includes a compressor 10 that receives air through an inlet 11 and compresses the air; a combustor 12 that receives compressed air from the compressor 10 and a flow of fuel, e.g., natural gas, from a fuel source (not shown), mixes the compressed air and fuel and combusts the mixture to produce the high energy exhaust gas; and a turbine section 13 that receives the flow of high energy exhaust gas from the combustor 12. In the turbine section 13, the high energy exhaust gas is expanded, and thermal energy of the exhaust gas is converted into kinetic energy that drives a shaft 14. The mechanical power of the shaft 14 drives the compressor 10 and an external load, such as the electrical generator 8 and the like. The flow of high energy exhaust gases is delivered from the turbine section 13 through an exhaust duct 16 to the HRSG 3. In the illustrated exemplary embodiment of the power plant 1, the gas turbine engine 2, the steam turbine system 4, and the generator 8 are arranged on a single shaft 14, but other configurations with separate shafts and external loads may also be used.

The steam turbine system 4 includes, in the illustrated exemplary embodiment of the power plant 1, a high-pressure (HP) steam turbine 17, an intermediate-pressure (IP) steam turbine 18, and a low-pressure (LP) steam turbine 19 with multiple steam admission points at the different pressures. The LP steam turbine 19 is coupled to the condenser 6 to exhaust used steam, which was used to produce power, to the condenser 6.

The HRSG 3 is a counter-flow heat exchanger arranged to heat feedwater that passes through the HRSG 3 using the high energy exhaust gases received from the gas turbine engine 2 via the exhaust duct 16. The HRSG 3 is associated with the steam turbine system 4 and includes a corresponding plurality of pressure stages, including an HP stage 21, an IP stage 22, and an LP stage 23, and a reheater 24 to generate steam at the various pressures and temperatures. The steam is used as vapor feed to the respective stages of the steam turbine system 4.

Each of the HP, IP, and LP stages 21, 22, 23 of the HRSG 3 may generally include one or more drums, economizers, evaporators, OT (once-through) section, and/or superheaters. For example, the HP stage 21 may include an HP drum 26, an HP economizer 27, an HP evaporator 28, and one or more HP superheaters 29. Similarly, the IP stage 22 may include an IP drum 31, an IP economizer 32, an IP evaporator 33, and an IP superheater 34. The LP stage 23 may include an LP drum 35, an LP economizer 36, an LP evaporator 37, and an LP superheater 38. The economizers, evaporators, and superheaters of the HP, IP, and LP stages 21, 22, 23 of the HRSG 3 and the reheater 24 are arranged as tubes or tube bundles in the interior of the HRSG 3 such that the high energy exhaust gases passing through the HRSG 3 may transfer heat to the fluids (feedwater or steam) circulating through the tubes or tube bundles. Although the multi-pressure HRSG 3 having the configuration shown in FIG. 1 is a preferred embodiment of a steam generating facility in the combined cycle power plant 1, other configurations of an HRSG and other steam generating equipment, like steam boiler devices of different types and the like, may be used.

As may be seen in FIG. 1, the power plant 1 includes a plurality of steam lines arranged to provide steam generated in the HRSG 3 to the steam turbine system 4. For example, the plurality of steam lines may include an LP steam transfer line 39 fluidly coupled between the LP drum 35 and the LP superheater 38 and an LP steam line 41 fluidly coupled between the LP superheater 38 and the LP steam turbine 19 to supply LP steam thereto. The IP stage 22 of the HRSG 3 may include an IP steam transfer line 42 fluidly coupled between the IP drum 31 and the IP superheater 34 and an IP steam line 43 fluidly connecting the IP superheater 34 to the reheater 24. Another steam line (not numbered in FIG. 1) may be used for transferring IP steam from the IP drum 31 back to the LP drum 35 if required. The HP stage 21 of the HRSG 3 may include an HP steam transfer line 44 fluidly coupled between the HP drum 26 and the HP superheater 29, an HP steam transmission line 46 fluidly connecting different sections of the HP superheater 29, if any, and an HP steam line 47 fluidly coupled between the HP superheater 29 and the HP steam turbine 17 for supplying HP steam thereto.

In addition, the reheater 24 may include a reheater steam transfer line 48 fluidly connecting different sections of the reheater 24, if any, a hot re-heat (HRH) line 49 fluidly coupled between an output of the reheater 24 and an input of the IP steam turbine 18 for supplying IP steam thereto, and a cold re-heat (CRH) line 51 fluidly coupled at one end to an input of the reheater 24 and the IP steam line 43 and at the other end to an output of the HP steam turbine 17 for receiving used HP steam from the HP steam turbine 17. At least some of the steam lines 39-51 may include an isolation valve and/or a control valve for blocking or regulating steam flow therethrough.

The power plant 1 further includes a permanent bypass system including a number of permanent operational steam bypass lines which may be used in normal operation, such as during load rejection, to supply the steam generated in the HRSG 3 to the condenser 6 bypassing the steam turbine system 4. In particular, the plurality of operational bypass lines may include an HP bypass line 52, an HRH bypass line 53, and an LP bypass line 54. The HP bypass line 52 is fluidly coupled between the HP steam line 47 and the CRH line 51 and includes an HP bypass valve 55 installed thereon to control HP bypass steam flow therethrough. The HRH bypass line 53 is fluidly coupled between the HRH line 49 and the condenser 6 and includes an HRH bypass valve 56 installed thereon to control IP bypass steam flow therethrough. The LP bypass line 54 is fluidly coupled between the LP steam line 41 and the condenser 6 and includes an LP bypass valve 57 installed thereon to control LP bypass steam flow therethrough.

Figure 2:
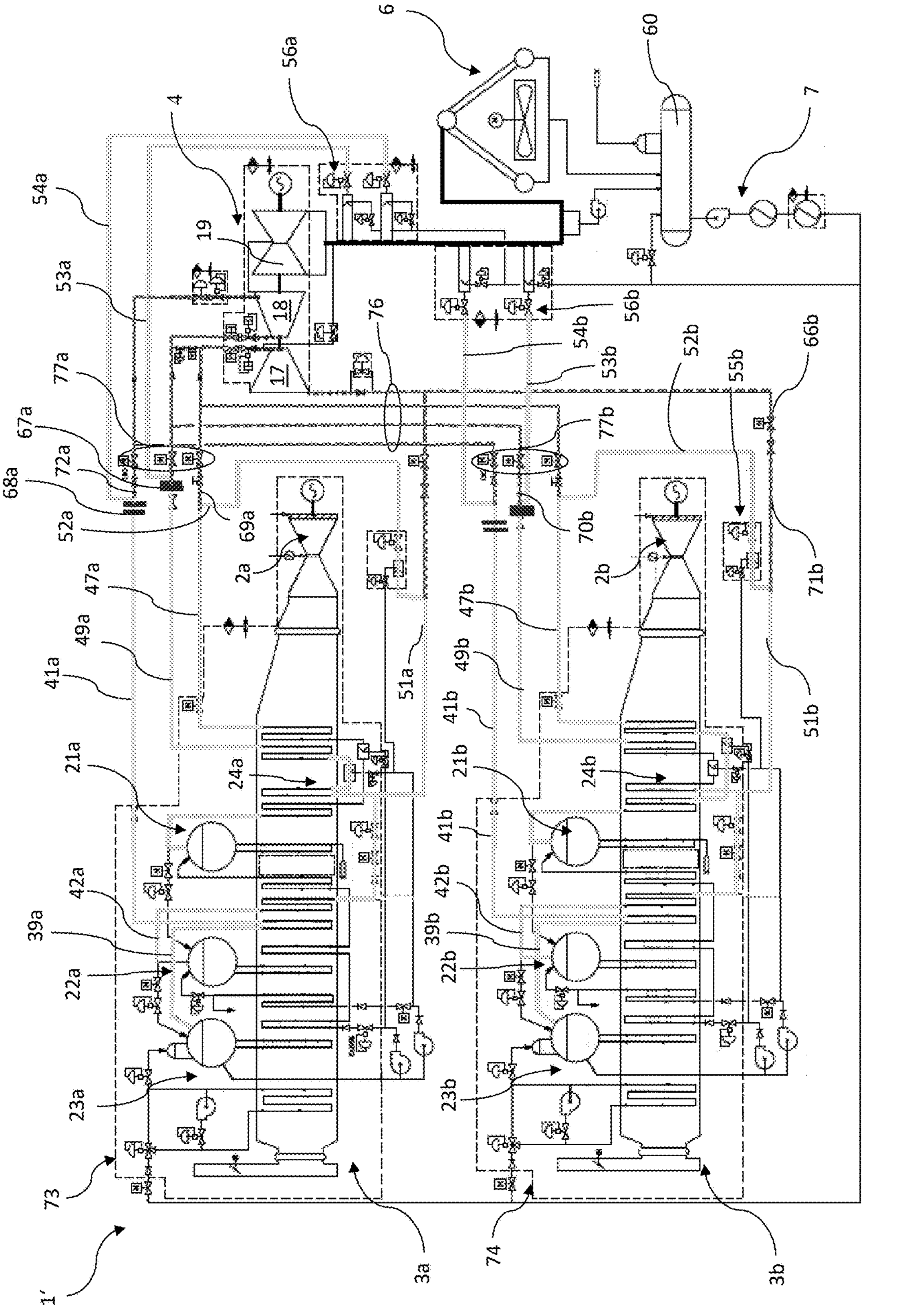
FIG. 2 is a process flow schematic of an embodiment of the present invention to accomplish pre-operational cleaning using validation steam blow of water and steam systems in a combined cycle power plant having a multi-HRSG configuration with isolation valves.

The condenser 6 is a large heat exchanger which is coupled to the steam turbine system 4, in particular the LP steam turbine 19, to receive used steam therefrom and which is arranged to cool down the used steam to condense it to water. Although several types of condensers are known, a common design contains a large number of small diameter tubes 58 through which cooling water is passed. The steam condensate from the condenser may fall into a hotwell 59 situated at the bottom of the condenser and/or may be provided to a condensate tank 60 (see FIG. 2). The condensate system 7 includes a condensate pump 61 and a condensate line 62. The condensate pump 61 returns the steam condensate from the condenser 6 to the HRSG 3 by means of the condensate line 62. Strainers (not shown) may be arranged at the suction side of the condensate pump 61 to remove particulate contamination from the steam condensate fed to the condensate pump 61 from the condenser hotwell 59 or the condensate tank 60 (FIG. 2) to prevent damage to the condensate pump 61 and other components of the condensate system 7. While a liquid cooled de-aerating condenser is shown in the embodiment of FIG. 1, any suitable condenser type may be used, including an air-cooled condenser which is schematically shown in the embodiment of FIG. 2.

In normal operation, the gas turbine engine 2 generates mechanical power that is converted into electrical power by the generator 8. The steam turbine system 4 may generate additional power from the steam received from the HRSG 3. Used steam from the steam turbine system 4 is condensed in the condenser 6 and returned to the HRSG 3 via the condensate system 7. Depending on the load requirements, one or more of the HP, IP and/or LP steam turbines 17, 18, 19 may not be used. Then, the respective steam turbine section may be bypassed using the operational HP, HRH, and LP bypass lines 52, 53, 54. Control and stop valve assemblies 63, 64, 65 are arranged at the inlets of the HP, IP, and LP steam turbines 17, 18, 19 to stop, open and control steam flow to the respective steam turbine stage. An isolation valve 66 is arranged on the CRH line 51 (e.g., in CRH line section 71) downstream of the outlet of the HP steam turbine 17.

During fabrication and erection or during refurbishing or servicing of the combined cycle power plant 1, contaminants, such as mud, sand, dust, weld spatter, swarf, welding electrode residuals, splinters, and other particulate contaminants, may remain in the system. To prevent contamination and damage of the steam turbine components during operation, all steam-carrying and water-carrying plant parts of the HRSG 3, the condenser 6 and the condensate system 7, the steam lines connecting the HRSG 3 to the steam turbine system 4 and to the condenser 6, and the operational bypass lines 52, 53, 54 must be freed of such contamination particles. To this end, a method of pre-operational cleaning of water and steam systems in a combined cycle power plant is provided. The pre-operational cleaning method of present disclosure will be described in the following in connection with the combined cycle power plant 1 shown in FIG. 1, but it may be applied to any other power plant that includes steam generating facilities.

As provided herein, the method of pre-operational cleaning starts with performing a pre-operational initial flushing and chemical cleaning operation on the water and steam system of the constructed combined cycle power plant 1. Substantially all parts and pipelines carrying steam or steam condensate, including HRSG drums, economizers, superheaters and reheater, the steam lines, auxiliary steam lines, bypass lines, feedwater lines, and the condensate system, may be flushed using treated de-ionized water to remove contaminants. In addition, further chemical cleaning steps, including one or more of hot degreasing, acid cleaning, passivation and rinsing, may be performed. Low points and HRSG collectors may be inspected and hydrolyzed, where required, to remove particulate contaminants. Finally, a dry air conservation step may follow.

When the chemical cleaning operation is completed, as the next step of the pre-operational cleaning method, a validation steam blow procedure is performed. According to the present method, a validation steam blow procedure to condenser is performed while the gas turbine engine is commissioned.

Thus, the gas turbine engine 2 is first fired, and commissioning of the gas turbine engine 2 is started. Normal gas turbine engine commissioning activities will drive the normal schedule with the gas turbine engine 2 in bypass operation, including Full Speed No Load (FSNL) operation, testing of safety valves of the HRSG 3, and loading the gas turbine engine 2 to base load, i.e., the maximum rated load, for combustion tuning.

The validation steam blow procedure is performed in parallel to the commissioning of the gas turbine engine 2. The validation steam blow procedure includes a steam blow operation, where steam is generated in the HRSG 3 using the high-energy exhaust gas from the gas turbine engine 2 and the steam is blown at high velocities, temperatures and cleaning force ratio conditions through the steam-carrying portion of the closed flow circuit formed by the HRSG 3, the piping connecting the HRSG 3 to the steam turbine system 4, the bypass lines 52, 53, 54, the condenser 6 and the condensate system 7 for cleaning the steam-carrying parts. In doing so, the validation steam is routed to bypass the steam turbine system 4 via the permanent bypass system that includes the permanent operational HP, HRH, and LP bypass lines 52, 53, 54 and is discharged to the condenser 6. The condensate produced in the condenser 6 is cleaned, where necessary, and returned back to the HRSG 3, thus forming a closed-loop circuit. The steam-blown steam lines of the closed-loop circuit of the validation steam blow are indicated by thicker solid lines in FIG. 1. The validation steam blow procedure further includes monitoring and validation of cleanliness of the steam-blown steam lines in parallel to the steam blowing.

The validation steam blow to condenser in combination with the simultaneous, parallel performance of the normal gas turbine engine commissioning presents various advantages. The power plant 1 will start up as per normal configuration without any temporary control and without requiring any temporary piping, which would otherwise be required for the validation steam blow procedure only and which would not be used during the normal operation. Rather, the permanent operational HP, HRH, and LP bypass lines 52, 53, 54 are used herein for the validation steam blow to the condenser 6. Since the steam and water are circulated in a closed circuit, demineralized water consumption may be limited. No noise and no visual pollution occur, and the procedure is emission compliant during the steam blow procedure. In addition, the normal gas turbine engine commissioning is performed in parallel, such that fired hours and fuel consumption to execute the procedure may also be reduced. There are no safety concerns as the power plant 1 is in normal operation. Efficient cleaning may be achieved with thermal cycling and high temperatures, and the required steam quality for normal operation can be achieved in a short period of time and in a cost-effective manner.

To reach the required disturbance factors and cleaning efficiencies during the steam blow procedure, while avoiding damage to the equipment to be steam blown, the validation steam blow process is preferably already integrated and taken into consideration in the initial design or concept phase of a project for constructing a new power plant. The steam blow operation will be performed while the gas turbine engine is operated at base load, and all operational piping of the HRSG 3, the steam lines 39-51, the bypass lines 52-54 and the bypass valves 55-57, which are to be effectively steam blown, are consequently each designed for such operating conditions and for a cleaning force ratio CFR of at least 1.1 or even at least 1.2. The cleaning force ratio CFR may be calculated as $$CFR = \left(\frac{Q_c}{Q_{max}}\right)^2 \times \frac{(PV)_c}{(PV)_{max}} \times \frac{P_{max}}{P_c},$$

wherein $Q_c$ is the calculated flow during cleaning, $Q_{max}$ is the maximum load flow, (PV), is the pressure-specific volume product during cleaning, $(PV)_{max}$ is the pressure specific volume product at maximum load flow, $P_{max}$ is the pressure at maximum load flow, and $P_c$ is the pressure during cleaning. Thus, the steam-carrying parts to be steam blown must meet more stringent requirements than the corresponding parts of conventional power plants under the maximum rated operating conditions.

In order to determine what the capability of the equipment of the steam and water system shall be for the steam blow procedure, it may be checked at which pressure each piping section shall be operated to exceed the expected CFR with the steam flow available, when operating the gas turbine system at base load under the expected realistic ambient conditions for the steam blow. Usually, the normal ambient conditions may be considered. In preferred embodiments of the power plant shown in FIG. 1, at least the steam lines 39-51, the bypass lines 52-54 and the bodies of the bypass valves 55-57 are sized and arranged for a cleaning force ratio CFR of at least 1.1. More preferably, at least some of these steam lines may be sized and arranged for a CFR of at least 1.2.

Some preparation work can be done to allow for the efficient and safe validation steam blow procedure. In particular, modulating sacrificial trims (not shown) may be installed in at least some of the HP, HRH, and LP bypass valves 55, 56, 57 in the operational HP, HRH, and LP bypass lines 52, 53, 54 to prevent operational trims to be damaged and to increase the flow coefficient (CV) capability of the bypass valves, where needed. Permanent trims will be sized based on the maximum loading cases, except the steam blow case, and to have a great durability. In contrast, the sacrificial trims are specifically designed for an increased or maximum flow coefficient CV. Durability plays a subordinate role.

The sacrificial trims may be designed to support a cleaning force ratio CFR of at least 1.2 for a single HRSG plant configuration and at least 1.03 for multiple-HRSG plant configurations. The required flow coefficient CV of the sacrificial trim may be calculated based on estimated conditions, and a margin of 10-20%, for example, can be added thereto in order to ensure that the required CFR can be met in true operating conditions at site. For the HP bypass valve 55, which is exposed to the largest load during the steam blow procedure, the sacrificial trim can be preferably designed to provide the maximum CV that the valve body can accommodate.

In preferred implementations, the modulating sacrificial trim installed may consist of a piston with an associated gasket and a cage having an increased number of holes or larger holes therein to allow for higher volumetric flows and flow velocities of the steam passing therethrough. The sacrificial trims are removed again and replaced by final operational trims after the steam blow procedure is completed.

The steam blow achieved in the bypass operation may require that bypass attemperation flows, if any, shall be taken into account for planning the validation steam blow procedure. For example, the temperature set point of the HP bypass line 52 can be set based on the expected pressure in the CRH line 51, as per normal bypass attemperation control, but using the expected CRH line pressure at the time of the validation steam blow.

In order to allow long sections of the steam-carrying piping to be cleaned, the take-offs of the permanent operational HP, HRH, and LP bypass lines 52, 53, 54 may be positioned as close to the steam turbine system 4 as can be accomplished. This means, they are positioned reasonably close to the steam turbine system 4 to be nearby the area of the steam turbine system 4, but in a sufficient distance to avoid the bypass lines 52, 53, 54 being affected by the steam turbine building, the type of the condenser 6 and their operation. The take-offs of the HP, HRH, and LP bypass lines 52, 53, and 54 will be positioned in close vicinity and just upstream of the steam control and isolation valve assemblies 63, 64, 65. The HP, HRH, and LP bypass lines 52, 53, and 54 shall not be installed in the area of the HRSG 3, in particular not on the HRSG pipe rack. The HRH and LP bypass lines 53, 54 run directly to the condenser 6 and may be generally installed close to the condenser 6 in the steam turbine area. The HP bypass line 52 shall not be installed directly in the steam turbine area, but as close as possible and reasonable thereto. The non-return valve 66 on the CRH line 51 and a downstream connection of the HP bypass line 52 to the CRH line 51 are also positioned as close to the HP steam turbine 17 as can be accomplished.

To allow for target inspection and monitoring of cleanliness at the steam temperatures and pressure operating conditions during the validation blow procedure, target inserts are installed in relevant portions of the steam-carrying piping. In particular, a first target insert 67 is installed in the HRH line 49 slightly upstream of the HRH bypass line 53 and the IP control and isolation valve assembly 64, and a second target insert 68 is installed in the LP steam line 41 slightly upstream of the LP bypass line 54 and the LP control and isolation valve assembly 65.

The target inserts 67, 68 are preferably using mirror or highly polished metal plates constructed of steel capable of withstanding the maximum steam conditions and forces of the respective steam flows in the HRH and LP steam lines 49, 41. The target plates of the target inserts 67, 68 are impacted by the debris entrained by the steam flow during the validation steam blow procedure and will visually show the presence of particle contamination entrained in the steam flow by means of particle impacts on the target (metal or mirror) plate.

Moreover, in the present method of the validation steam blow, steam flow meters (not shown) may be installed in relevant portions of the operational piping of the HRSG 3, the steam lines 39-51 and the bypass lines 52-54 to measure the flows of the steam blow in these portions. The steam flow meters (not shown in FIG. 1) can be of a venturi or nozzle type, for example. The cleaning force ratios CFR in the relevant portions can then be calculated online based on the steam flow measurements received from the steam flow meters during the validation blow procedure. In particular, the CFR calculations can be included as part of the normal plant control software of the control system 9 to verify the cleaning force ratio during the validation steam blow procedure. The calculated CFR values can be presented to the operator of the power plant 1 via a suitable graphical interface during the validation steam blow procedure to facilitate monitoring and verifying that the required steam blow conditions are met.

The method of pre-operational cleaning may further include providing inspection/cleaning ports (not shown in FIG. 1) in non-steam blown sections of the steam lines and inspecting and cleaning the non-steam blown sections after the validation blow procedure is completed. The non-steam blown sections are indicated by thicker dashed lines in FIG. 1 (and other Figures) and include, in particular, a non-blown HP steam line section 69 between the take-off connection of the HP bypass line 52 to the CRH line 51 and the HP control and isolation valve assembly 63; a non-blown HRH line section 70 between the take-off connection of the HRH bypass line 53 to the condenser 6 and the IP control and isolation valve assembly 64; a non-blown CRH line section 71 between the downstream connection of the HP bypass line 52 to the CRH line 51 and the non-return valve 66 at the outlet of the HP steam turbine 17; and a non-blown LP steam line section 72 between the take-off connection of the LP bypass line 54 to the condenser 6 and the LP control and isolation valve assembly 65.

The inspection/cleaning ports in the non-steam blown sections 69-72 are provided at suitable locations to facilitate easy inspection and cleaning. Inspection can be performed using borescopes or robots equipped with cameras, and remaining contaminants in the critical portions can be removed by rinsing or other suitable means. Other inspection/cleaning ports can be provided to facilitate access to other piping portions to allow for inspection and cleaning of dead legs, drain ports, and the like.

In some further embodiments of the combined cycle power plant 1, in order to make the method of pre-operational cleaning more efficient, at least some of the take-off connections of the HP, HRH, and LP bypass lines 52, 53, 54 can be realized with a T connection (not shown) which is straight to the respective bypass line 52, 53, or 54 and not straight to the respective steam turbine 17, 18, or 19. Such an arrangement facilitates reducing accumulation of debris in dead legs upstream of the respective steam turbine 17, 18, or 19 and may save time for inspecting on critical paths and cleaning dirt therein. Inspections and cleaning ports might then possibly not be required and may be dispensed with. This option is preferably applicable for configurations without steam isolation valves or sections upstream of steam isolation valves and can be of particular interest in the case of HP steam, where the option of adding an inspection flange might be more challenging. Advantageously, it has been found that a straight line to a bypass line may also limit erosion of steam turbine valves during long-term plant operation.

Referring now to FIG. 2, a schematic of a combined cycle power plant 1' including a multi-unit configuration is shown. In the exemplary embodiment shown in FIG. 2, the power plant 1' comprises a single steam turbine system 4, a first unit 73 including a first HRSG **3*a* and a first gas turbine engine 2*a*, and a second unit 74 including a second HRSG 3*b* and a second gas turbine engine 2*b*. The relevant components of the first unit 73 are shown using corresponding reference signs of FIG. 1 denoted with an additional "a", while the corresponding components of the second unit 74** are denoted with an additional "b".

As can be seen in FIG. 2, the method of pre-operational cleaning of water and steam systems in the combined cycle power plant 1' can be advantageously performed for each of the first and second unit 73, 74 independently of the other unit. Here again, the steam-blown steam lines are indicated by thicker solid lines in FIG. 2, while the non-steam blown sections are indicated by thicker dashed lines. The non-steam blown sections extend from the bypass take-offs up to the steam turbine valves. All non-steam blown sections need to be pre-cleaned, inspected and validated after chemical cleaning. The portions immediately upstream of the steam isolation valves may accumulate debris during the validation steam blow and may need to be post-cleaned (assuming that the steam isolation valves are closed during validation steam blow to avoid carry over of accumulation to portions downstream of the steam isolation valves).

The validation blow procedures for the first and second unit 73, 74 may be performed simultaneously, but are more preferably performed sequentially (i.e., one after the other). Again, no temporary piping or temporary control is required for the validation steam blow operation of each of the first and second units 73, 74. Rather, only permanent operational steam lines, including the bypass lines 52*a*, 52*b*, 53*a*, 53*b*, 54*a*, 54*b*, can be used for the steam blow procedure to the condenser 6 that is performed in parallel with the normal commissioning of the gas turbine engines 2*a*, 2*b*. The condenser 6 in FIG. 2 is shown to be an air-cooled condenser, but it is understood that it might also be a water-cooled condenser or any other type of a condenser, e.g., a direct condenser (jet condenser).

In some preferred embodiments, the validation blow procedure may be performed on one of the first and second units 73, 74, while simultaneously dead legs and other critical paths are inspected and post-cleaned following the validation blow procedure in the other unit. As generally common sections are not included, the steam blow, inspection and post-cleaning procedures may be performed independently for each of the first and second units 73, 74.

In the multi-unit configuration of the combined cycle power plant 1' shown in FIG. 2, the first and the second units 73, 74 are fluidly coupled to each other through communication lines 76 which respectively connect the LP steam lines 41*a*, 41*b*, the HRH lines 49*a*, 49*b* and the HP steam lines 47*a*, 47*b* downstream of the take-off connections of the respective HP bypass lines 52*a*, 52*b*, HRH bypass lines 53*a*, 53*b* and LP bypass lines 54*a*, 54*b* together. The communication lines 76 are not included in the validation steam blow procedure. Isolation valves 77*a*, 77*b* are integrated slightly downstream of the respective take-off connections of the bypass lines 52*a*, 52*b*, 53*a*, 53*b*, 54*a*, 54*b* to block the communication lines 76 during the validation steam blow procedure such that the steam blow can be routed via the bypass lines 52*a*, 52*b*, 53*a*, 53*b*, 54*a*, 54*b* to the condenser 6 and prevent the potential contamination of those coupling/common lines during the validation steam blow. After chemical cleaning and prior to the validation steam blow, the piping section downstream of the isolation valves 77*a*, 77*b* including communication lines 76 up to the steam turbines 17, 18, 19 are high-pressure water jetted and completely (100%) inspected and validated.

Apart from the provision of the two units 73, 74 and the communication lines 76, the configuration of the power plant 1', in particular the configuration of the steam turbine system 4 and each unit 73, 74, corresponds to the configuration of the power plant 1, in particular the steam turbine system 4 and the combination of the gas turbine engine 2 and the HRSG 3 in the embodiment of FIG. 1. The operation of these units and, in particular, the method of pre-operational cleaning of water and steam systems in the combined cycle power plants 1 and 1' also substantially correspond to each other such that the above description of the configurations and the pre-operational cleaning method as well as the technical effects and advantages associated therewith equally apply to the embodiment of FIG. 2.

Figure 3:
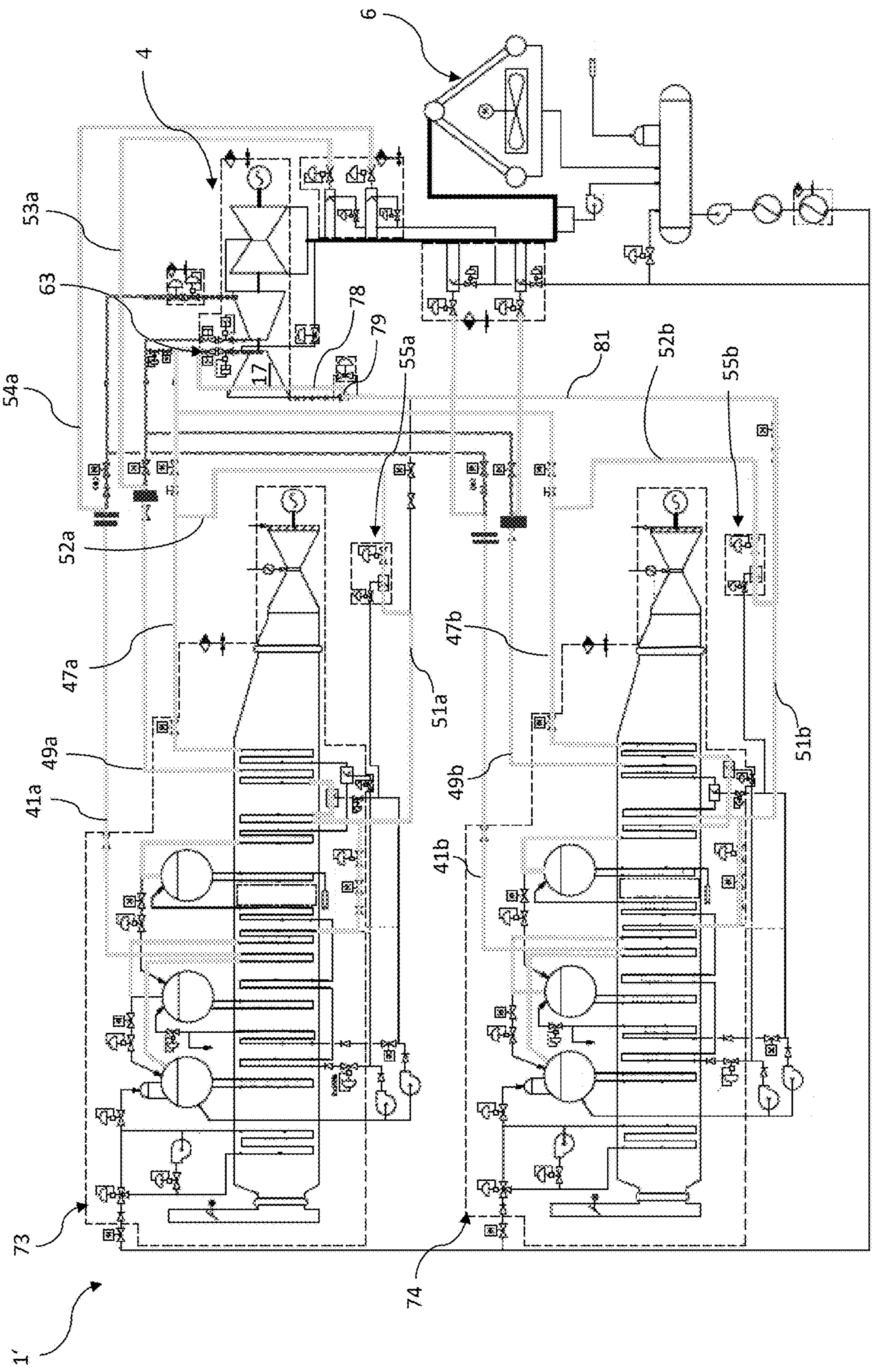
FIG. 3 is a process flow schematic for an alternative embodiment of the combined cycle power plant in a multi-unit configuration, similar to FIG. 2, illustrating a validation flow path with a temporary jumper from the high-pressure steam turbine valves to the cold re-heat line in a multi-HRSG configuration of the combined cycle power plant; and, FIGS. 4 and 5 are process flow schematics of a combined cycle power plant in the multi-unit configuration illustrating further embodiments of the validation steam blow procedure according to present invention using bypass of both units to avoid oversizing the bypass valves.

Referring now to FIG. 3, a schematic of a modification of the embodiment of the power plant 1' of FIG. 2 is shown. The entire description of the embodiment of FIG. 2 in combination with the description of the embodiment of FIG. 1 shall also apply to the embodiment of FIG. 3 except for the differences mentioned below. The same components in the embodiments of FIGS. 2 and 3 are indicated by the same reference numbers.

The embodiment of FIG. 3 differs from the embodiment of FIG. 2 essentially in that a temporary jumper 78 is installed from the HP control and isolation valve assembly 63 of the HP steam turbine 17 to a non-return valve 79 on a common CRH line 81 upstream of the take-off connections of the CRH lines 51*a*, 51*b* of the first and second units 73, 74. The temporary jumper 78 allows for routing the steam flow in the validation steam flow procedure from the HP steam line 47*a*, 47*b* through the temporary jumper 78 directly to the CRH lines 51*a*, 51*b* without using or with reduced use of the HP bypass lines 52*a*, 52*b*. This embodiment is advantageous in applications, where the HP bypass valves 55*a*, 55*b* are not capable of reaching the sufficient CFR on the HP lines or to limit the non-blown sections of the HP steam lines 47*a*, 47*b* and CRH lines 51*a*, 51*b*. The HRH bypass valves 56*a*, 56*b* are sized to allow for achieving the correct CFR on the HP and HRH steam lines.

In order not to overheat the CRH lines 81, 51*a*, 51*b* and to control the temperature of the steam flowing through the CRH lines, an HP steam terminal attemperator (not shown) may be designed and arranged to allow attemperation of the HP steam prior to entering the common CRH line 81 for the maximum steam blow conditions. When no HP terminal attemperator is available, a specific port can be planned on the HP steam piping to allow a temporary attemperator to be connected during the validation blow. All the other aspects described above remain applicable.

Figure 4:
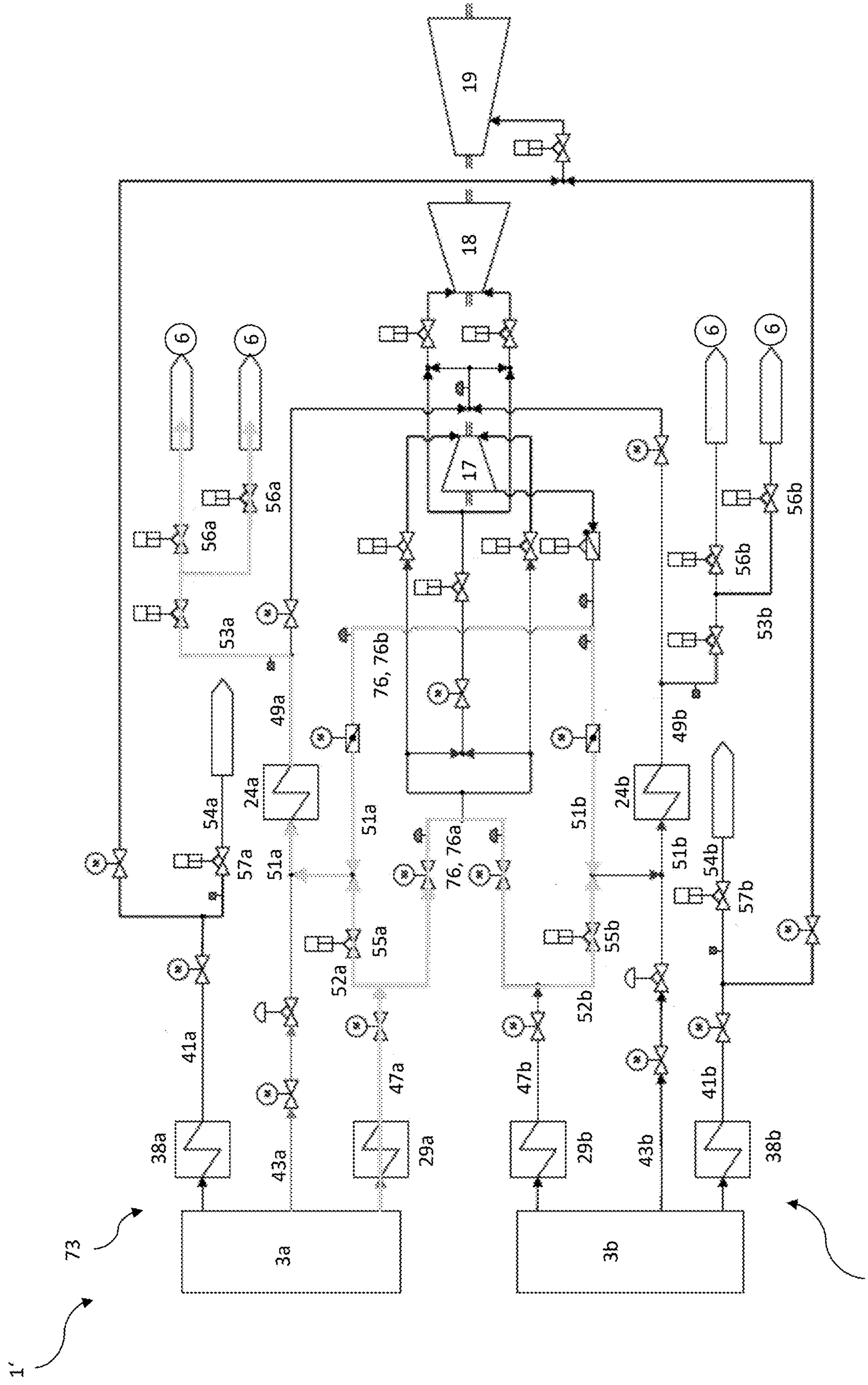
Figure 5:
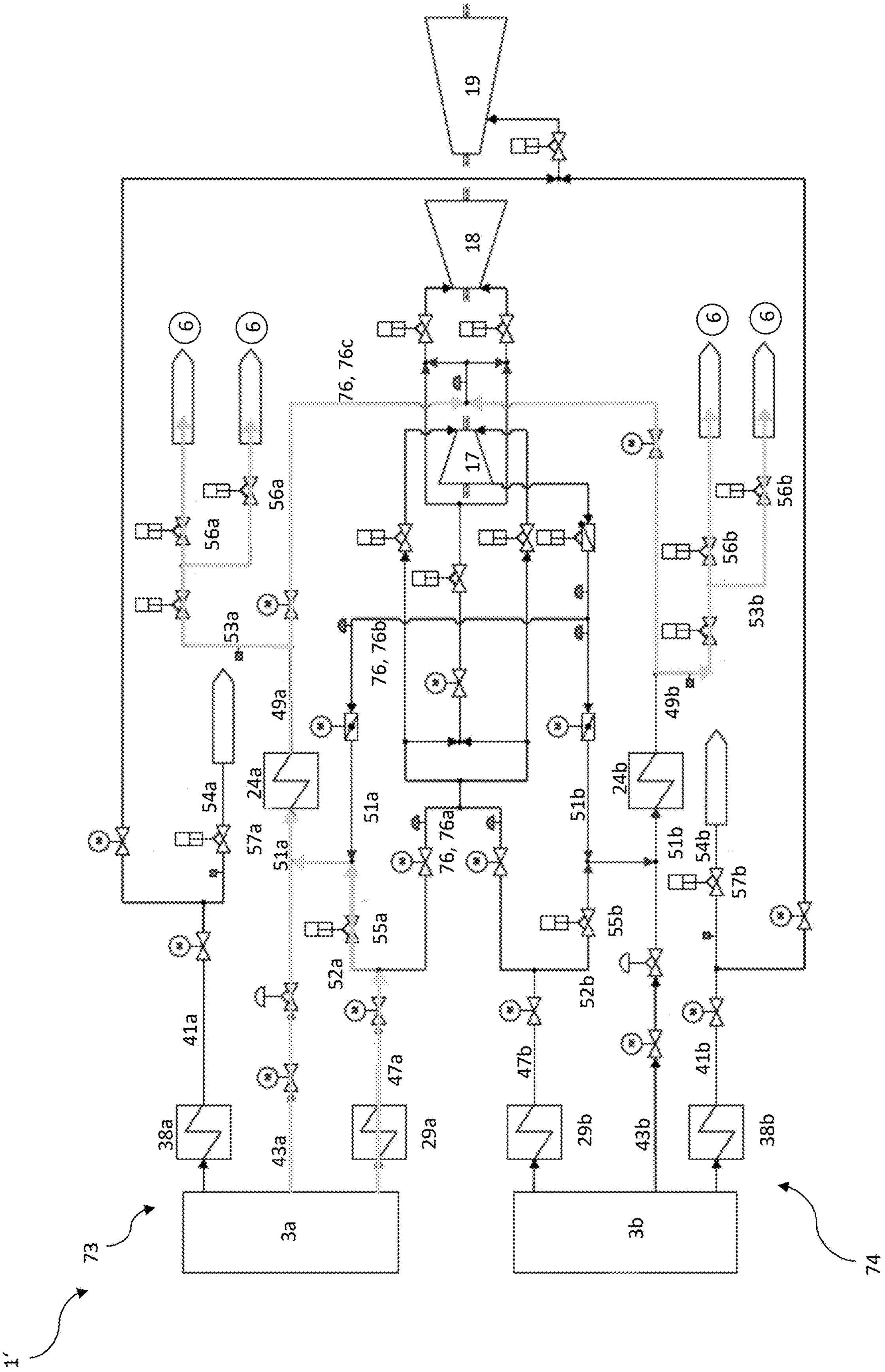

FIGS. 4 and 5 show the embodiment of the combined cycle power plant 1' of FIG. 2 in a modified schematic process flow representation. Generally, the configuration of the power plant shown in FIGS. 4 and 5 corresponds to that of the power plant 1' shown in FIG. 2. Equal reference signs are assigned to the same components in FIGS. 4, 5 and those in FIG. 2 and generally the above description of the embodiment of FIG. 2 equally applies to the embodiment shown in FIGS. 4 and 5. In this plant configuration, only one HRSG 3*a* or 3*b* is heated to generate steam, while the other HRSG shall be in standby.

In the embodiment of FIGS. 4 and 5, only a part of the validation steam blow procedure is slightly modified in order not to oversize the bypass valves, in particular the HP bypass valves 55*a*, 55*b* in the first and second unit 73, 74. To this end, while the validation steam blow procedure is performed in one of the first and second units 73 or 74, at least one bypass line and bypass valve is used in the other unit 74 or 73 to route at least a portion of the validation steam flow therethrough such that the volumetric flow of the steam may be reduced in the bypass valves. The validation steam flow is indicated again by thicker solid lines in FIGS. 4 and 5.

In the scenario shown in FIG. 4, validation steam is provided in the first unit 73 from the HRSG 3*a* through the HP superheater 29*a* to the take-off connection of the HP bypass line 52*a*, where the validation steam flow is divided into two portions. A first portion of the validation steam flow is directed through the HP bypass line 52*a* and the HP bypass valve 55*a* and through the CRH line 51*a* to the reheater 24*a*. A second portion of the validation steam blow is diverted through a communication line 76*a* of the communication lines 76, that connects the HP steam lines 47*a*, 47*b* of the two units 73, 74 together, to the HP bypass line 52*b* of the second unit 74. The second portion of the validation steam flow is then routed through the HP bypass line 52*b* and the HP bypass valve 55*b*, the CRH line 51*b* and a further common communication line 76*b* of the communication lines 76 back to the CRH-line 51*a* of the first unit 73 to mix with the first portion of validation steam flow and to be provided to the reheater 24*a* of the first unit 73. To allow for such a validation steam flow, all control and isolation valves in the HP-steam line 47*a*, the common communication line 76*a*, the CRH lines 51*a*, 51*b*, and the common communication line 76*b* need to be open. From the reheater 24*a*, the combined validation steam flow is then discharged via the HRH line 49*a* and the HRH bypass line 53*a* of the first unit 73 directly to the condenser 6.

Similarly, the HP steam flow applied to the second unit 74 during the validation steam flow procedure can be controlled such that the HP steam flow is divided and routed through both the HP bypass lines 52*a*, 52*b* of both the units 73 and 74, the CRH lines 51*a*, 51*b* and the common communication lines 76*a*, 76*b* and then recombined and provided through the reheater 24*b* and the HRH bypass line 53*b* of the second unit 74 directly to the condenser 6.

In the example shown in FIG. 4, the validation steam blow procedure is not performed independently between the first and second units 73 and 74, but the requirements for the HP bypass lines 52*a*, 52*b* and the HP bypass valves 55*a*, 55*b* can be reduced.

In the modified process flow shown in FIG. 5, HP steam from the HRSG 3*a* of the first unit 73 is routed through the HP steam line 47*a* and through the HP bypass line 52*a* and the HP bypass valve 55*a* to the reheater 24*a*. The first portion of the validation steam flow is then provided from the reheater 24*a* through the HRH line 49*a*, the HRH bypass line 53*a* and the HRH bypass valve 56*a* of the first unit 73 directly to the condenser 6. A second portion of the validation steam flow is diverted in the HRH line 49*a* downstream of the reheater 24*a* and routed through a common communication line 76*c* of the communication lines 76 to the HRH line 49*b* of the second unit 74. The second portion of the validation steam flow can then be discharged through the HRH bypass line 53*b* and the HRH bypass valve 56*b* directly to the condenser 6. Thus, the validation steam flow can be divided and passed through the HRH bypass lines and bypass valves of both the first and second units 73, 74, thereby reducing the sizing requirement imposed on the HRH bypass lines and HRH bypass valves to reach the required CFR.

Technical effects and advantages of the method of pre-operational cleaning of water and steam systems in combined cycle power plants and the corresponding combined cycle power plant according to the present invention include at least the following: The power plant can be started as per normal configuration, with no temporary control, such that an easy start up sequence is provided. Efficient cleaning may be achieved with high thermal cycles and high temperatures as the power plant is run at full load (base load) of the gas turbine engine during the initial power plant commissioning. Fast steam quality can be achieved with condenser cleaning and closed-loop circuit operation at higher load. Generally, no temporary piping and no temporary control is required for performing the validation steam blow procedure. Flame hours and natural gas or other fuel gas consumption can be limited. Demineralized water consumption may also be limited. Normal gas turbine and generator commissioning can be performed in parallel to the validation blows with limited shutdown for reconfiguration. Minimal time is required for remaining inspections and cleaning on critical paths. There are no safety concerns, as the plant is in normal operation, and there is no noise and no visual pollution. The gas turbine exhaust emission can be reduced, because steam blow is performed above minimum environment load. Selective Catalytic Reduction (SCR) catalysts can be installed directly after the validation steam blow during the steam blow outage for inspection and final cleaning, as the gas turbine engine has already run at base load, which offers the maximum poison protection coming from greases and dust from the gas turbine engine and HRSG air duct flow for the catalysts and removes the requirement for further shutdown during the hot commissioning. In a multi-unit configuration of a combined cycle power plant, the validation steam blow procedures can be performed independently for each unit. Alternatively, the validation steam blow procedures in both units can be performed in a combined manner and/or using a short length temporary jumper to allow for reducing requirements on the bypass valves used.

The invention claimed is:

1. A method of pre-operational cleaning of water and steam systems in a combined cycle power plant including a gas turbine engine, a steam turbine system, a condenser, and a heat recovery steam generator (HRSG), the method comprising:

performing a pre-operational initial flushing and chemical cleaning operation on the water and steam systems of the combined cycle power plant, once finally constructed;

firing the gas turbine engine and commissioning the gas turbine engine;

while the gas turbine engine is being commissioned, performing a validation steam blow procedure including a steam blow operation, wherein steam is generated in the HRSG and blown at velocities, temperatures, and cleaning force ratio (CFR) conditions through a portion of a closed flow circuit for cleaning steam-carrying parts of the HRSG and steam lines connecting the HRSG to the steam turbine system, wherein the CFR is a function of a calculated flow during cleaning (Qc) divided by a maximum load flow (Qmax), wherein the steam is routed to bypass the steam turbine system via operational bypass lines, without using any temporary piping, and is discharged to the condenser; and monitoring and validating cleanliness of selected steam-blown steam lines.

2. The method of claim 1, wherein the steam blow operation is performed while the gas turbine engine is operated at base load; and wherein the steam-carrying parts of the HRSG, the steam lines, and the operational bypass lines including bypass valves to be steam-blown are each designed for a CFR of at least 1.1, wherein the CFR is calculated by an equation:

$$CFR = \left(\frac{Q_c}{Q_{max}}\right)^2 \times \frac{(PV)_c}{(PV)_{max}} \times \frac{P_{max}}{P_c}$$

wherein Qc is the calculated flow during cleaning, Qmax is the maximum load flow, (PV)c is a pressure-specific volume product during cleaning, (PV) max is a pressure specific volume product at maximum load flow, Pmax is a pressure at maximum load flow, and Pc is a pressure during cleaning.

3. The method of claim 2, further comprising installing steam flow meters in portions of the steam-carrying parts of the HRSG, the steam lines, and the operational bypass lines; and calculating the CFR in the portions based on steam flow measurements of the steam flow meters during the validation steam blow procedure.

4. The method of claim 1, further comprising providing inspection/cleaning ports in non-steam blown sections of the steam lines; and inspecting and cleaning the non-steam blown sections after the validation steam blow procedure is completed.

5. The method of claim 1, wherein the HRSG has a plurality of pressure stages including a high-pressure (HP) stage, an intermediate-pressure (IP) stage, a low-pressure (LP) stage, and a reheater;

wherein the steam turbine system includes an HP steam turbine, an IP steam turbine, and an LP steam turbine;

wherein the steam lines include an HP steam line for supplying HP steam from the HP stage of the HRSG towards the HP steam turbine, an IP steam line connecting the IP stage of the HRSG to the reheater, a hot re-heat (HRH) line for supplying IP steam from the reheater towards the IP steam turbine, a cold re-heat (CRH) line for receiving used HP steam from the HP steam turbine and supplying the used HP steam to the reheater, an operational HP bypass line arranged between the HP steam line and the CRH line, an operational HRH bypass line arranged between the HRH line and the condenser, and an operational LP bypass line arranged between the LP steam line and the condenser; and wherein designing of the steam-carrying parts of the HRSG, steam lines, and operational bypass lines including bypass valves includes sizing and arranging at least the HP steam, IP steam, HRH, CRH, and LP steam lines and the HP, HRH, and LP bypass lines for a CFR of at least 1.1, wherein the CFR is calculated by an equation:

$$CFR = \left(\frac{Q_c}{Q_{max}}\right)^2 \times \frac{(PV)_c}{(PV)_{max}} \times \frac{P_{max}}{P_c}$$

wherein Qc is the calculated flow during cleaning, Qmax is the maximum load flow, (PV)c is a pressure-specific volume product during cleaning, (PV) max is a pressure specific volume product at maximum load flow, Pmax is a pressure at maximum load flow, and Pc is a pressure during cleaning.

6. The method of claim 5, further comprising installing target inserts in the form of polished steel plates in the HRH line and the LP steam line, the target inserts configured and arranged to allow for online target inspection and monitoring of cleanliness of the steam blown steam lines.

7. The method of claim 5, further comprising providing at least some of the operational HP, HRH, and LP bypass lines with respective HP, HRH, and LP bypass valves having modulating sacrificial trims designed to increase the flow coefficient (CV) capability of the respective bypass valves so as to support a cleaning force ratio CFR of at least 1.2 for a combined cycle power plant configuration having a single HRSG and at least 1.03 for a combined cycle power plant configuration having multiple HRSGs.

8. The method of claim 7, wherein the combined cycle power plant includes a multi-unit configuration comprising a single steam turbine system, a first unit including a first HRSG and a first gas turbine engine, and a second unit including a second HRSG and a second gas turbine engine.

9. The method of claim 7, further comprising positioning take-off connections of the operational HP, HRH, and LP bypass lines upstream of control and isolation valve assemblies of the HP, IP, and LP steam turbines; and positioning a non-return valve on the CRH line and a downstream connection of the HP bypass line to the CRH line.

10. The method of claim 9, further comprising providing at least some of the take-off connections of the HP, HRH, and LP bypass lines with a T connection which is straight to the respective bypass line and not straight to the respective steam turbine section to reduce accumulation of debris in dead legs upstream of the respective steam turbine section.

11. The method of claim 1, wherein the combined cycle power plant has a multi-unit configuration comprising a single steam turbine system, a first unit including a first HRSG and a first gas turbine engine, and a second unit including a second HRSG and a second gas turbine engine, the method comprising performing the validation steam blow procedures independently between the first and second units.

12. The method of claim 11, comprising performing the validation blow procedures for the first and the second units one after the other and performing the validation steam blow procedure on one of the first and second units, while simultaneously inspecting and cleaning dead legs following the validation blow procedure in the other unit.

13. The method of claim 1, wherein the combined cycle power plant includes a multi-unit configuration comprising a single steam turbine system, a first unit including a first HRSG and a first gas turbine engine, and a second unit including a second HRSG and a second gas turbine engine, the method comprising, while performing the validation steam blow procedure in one of the first and second units, using at least one bypass line and bypass valve in the other unit to route the validation steam therethrough.

14. A combined cycle power plant, comprising:

a gas turbine engine for generating power;

a heat recovery steam generator (HRSG) fluidly connected to the gas turbine engine for receiving exhaust gas produced from the generation of power in the gas turbine engine and configured for producing steam from the exhaust gas;

a steam turbine system fluidly connected to the HRSG via steam lines for receiving steam produced in the HRSG and configured for producing additional power from the steam;

a condenser coupled to the steam turbine system for condensing used steam output from the steam turbine system and a condensate system for returning condensate from the condenser to the HRSG;

operational bypass lines fluidly connected between the steam lines and the condenser and arranged to bypass the steam turbine system; and a control system for controlling normal operation of the gas turbine engine, the HRSG, the steam turbine system, and the condenser for generating power under varying operating conditions, the control system being further configured to perform a pre-operational cleaning of water and steam systems in the combined cycle power plant by:

firing the gas turbine engine and commissioning the gas turbine engine;

while the gas turbine engine is being commissioned, performing a validation steam blow procedure including a steam blow operation, wherein steam is generated in the HRSG and blown at velocities, temperatures, and cleaning force ratio (CFR) conditions through a portion of a closed flow circuit for cleaning steam-carrying parts of the HRSG and steam lines connecting the HRSG to the steam turbine system, wherein the CFR is a function of a calculated flow during cleaning (Qc) divided by a maximum load flow (Qmax), wherein the steam is routed to bypass the steam turbine system via the operational bypass lines, without using any temporary piping, and is discharged to the condenser; and monitoring and validating cleanliness of selected steam blown steam lines.

15. The combined cycle power plant of claim 14, wherein the HRSG has a plurality of pressure stages including a high-pressure (HP) stage, an intermediate-pressure (IP) stage, a low-pressure (LP) stage, and a reheater;

wherein the steam turbine system includes an HP steam turbine, an IP steam turbine, and an LP steam turbine;

wherein the steam lines include an HP steam line for supplying HP steam from the HP stage of the HRSG towards the HP steam turbine, an IP steam line connecting the IP stage of the HRSG to the reheater, a hot re-heat (HRH) line for supplying IP steam from the reheater towards the IP steam turbine, a cold re-heat (CRH) line for receiving used HP steam from the HP steam turbine and supplying the used HP steam to the reheater, an operational HP bypass line arranged between the HP steam line and the CRH line, an operational HRH bypass line arranged between the HRH line and the condenser, and an operational LP bypass line arranged between the LP steam line and the condenser; and, wherein designing of the steam-carrying parts of the HRSG, steam lines, and operational bypass lines including bypass valves includes sizing and arranging at least the HP steam, IP steam, HRH, CRH, and LP steam lines and the HP, HRH, and LP bypass lines for a CFR of at least 1.1, wherein the CFR is calculated by an equation:

$$CFR = \left(\frac{Q_c}{Q_{max}}\right)^2 \times \frac{(PV)_c}{(PV)_{max}} \times \frac{P_{max}}{P_c}$$

wherein Qc is the calculated flow during cleaning, Qmax is the maximum load flow, (PV)c is a pressure-specific volume product during cleaning, (PV) max is a pressure specific volume product at maximum load flow, Pmax is a pressure at maximum load flow, and Pc is a pressure during cleaning.

16. The combined cycle power plant of claim 15, further comprising target inserts in the form of polished steel plates installed in each of the HRH line and the LP steam line, wherein the target inserts are configured and arranged to allow for online target inspection and monitoring of cleanliness of the steam blown steam lines.

17. The combined cycle power plant of claim 15, wherein at least some of the operational HP, HRH, and LP bypass lines are provided with respective HP, HRH, and LP bypass valves having modulating sacrificial trims designed to increase the flow coefficient (CV) capability of the respective bypass valves so as to support a cleaning force ratio CFR of at least 1.2 for a combined cycle power plant configuration having a single HRSG and at least 1.03 for a combined cycle power plant configuration having multiple HRSGs.

18. The combined cycle power plant of claim 17, wherein the combined cycle power plant includes a multi-unit configuration comprising a single steam turbine system, a first unit including a first HRSG and a first gas turbine engine, and a second unit including a second HRSG and a second gas turbine engine.

19. The combined cycle power plant of claim 17, comprising take-off connections of the operational HP, HRH, and LP bypass lines positioned upstream of control and isolation valve assemblies of the HP, IP, and LP steam turbines; and further comprising a non-return valve on the CRH line and a downstream connection of the HP bypass line to the CRH line; wherein at least some of the take-off connections of the operational HP, HRH, and LP bypass lines are provided with a T connection which is straight to the respective bypass line and which is not straight to the respective steam turbine section to reduce accumulation of debris in dead legs upstream of the respective steam turbine section.

20. The combined cycle power plant of claim 14, further comprising steam flow meters installed in portions of the steam-carrying parts of the HRSG, the steam lines, and the operational bypass lines; and wherein the control system calculates the CFR in the portions based on steam flow measurements of the steam flow meters during the validation steam blow procedure.

* * * * *